Figure 2:
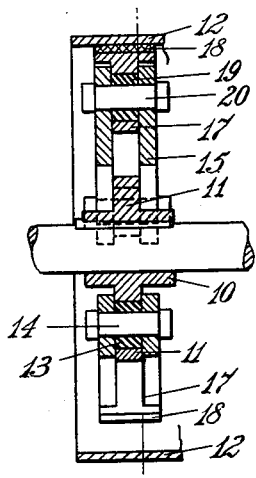

March 11, 1952  C. W. CHAPMAN  2,588,482
FRICTION CLUTCH, BRAKE, AND COUPLING
Filed June 4, 1946  2 SHEETS—SHEET 1

Inventor
C. W. Chapman
By Glascock Downing Seibold
Attys.

March 11, 1952  C. W. CHAPMAN  2,588,482
FRICTION CLUTCH, BRAKE, AND COUPLING
Filed June 4, 1946  2 SHEETS—SHEET 2
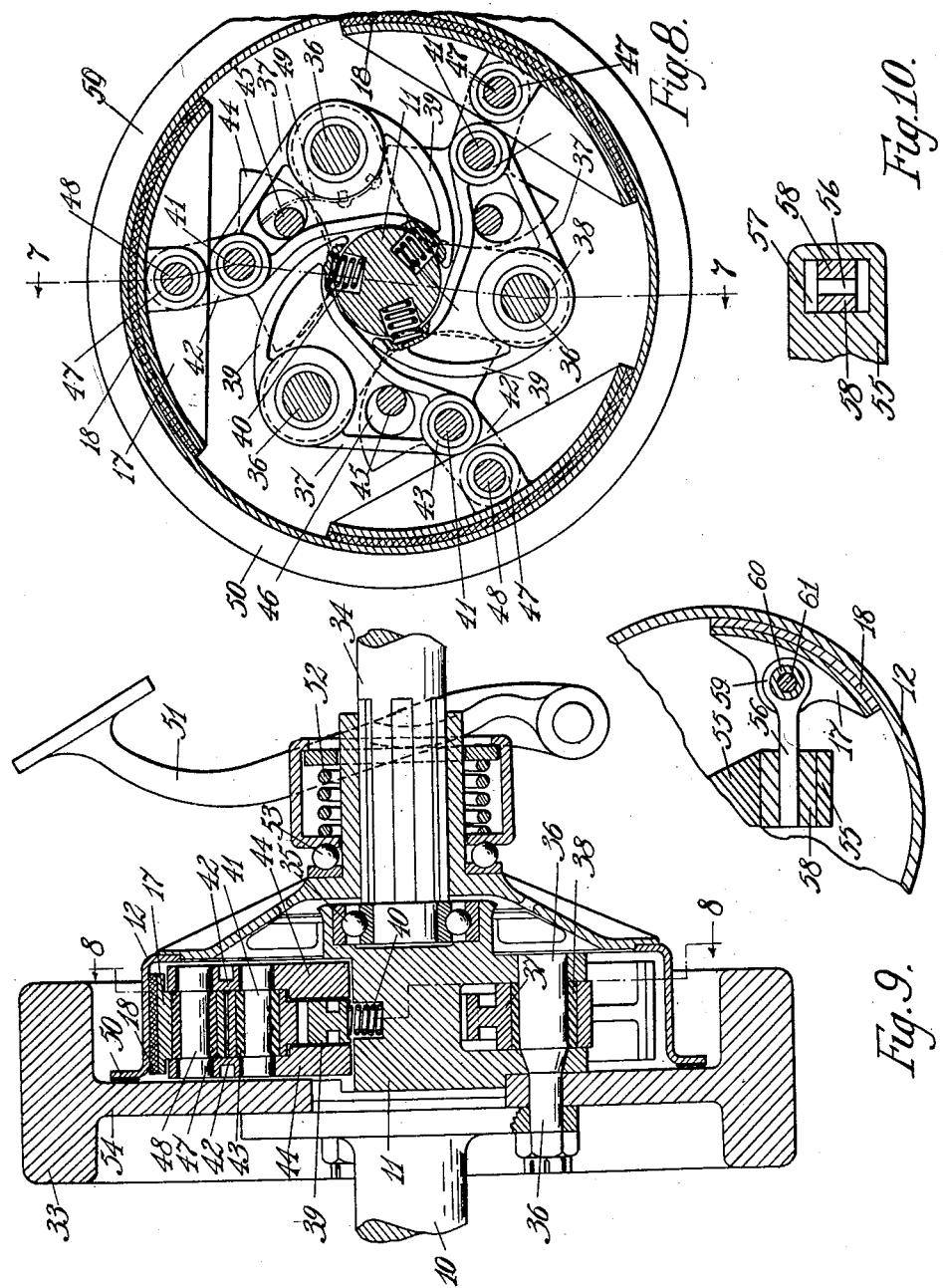
Inventor
C. W. Chapman Patented Mar. 11, 1952

2,588,482

UNITED STATES PATENT OFFICE 2,588,482

FRICTION CLUTCH, BRAKE, AND COUPLING

Charles Wallace Chapman, Burstow, Horley, England

Application June 4, 1946, Serial No. 674,310
In Great Britain March 15, 1946

12 Claims. (Cl. 192—105)

1

This invention relates to friction clutches, brakes and couplings (hereinafter referred to as "friction coupling") of the kind which comprise a driving member and a driven member (which latter may be stationary) and one or more clutch, brake or coupling elements (hereinafter referred to as "coupling elements") pivotally connected with the driving member and arranged to be thrown by centrifugal force (which in some cases may be supplemented or opposed by mechanical means) into engagement with the driven member, the said coupling elements being so arranged and formed that normal rotation of the driving member tends to wedge them toward the driven member. In a brake the driven member may be stationary.

The invention has for its object to provide an improved friction coupling of the above kind which provides inter alia (a) that the driving and driven parts do not require to be mechanically coupled together, (b) that the driven member is driven by the driving member by friction, (c) that in operation slip between the two members is avoided, and (d) that mechanical bearings to provide the desired pivotal connections between the operating parts of the coupling, and which require to be lubricated, are unnecessary.

The invention provides a friction coupling of the above kind wherein each coupling element comprises an arm resiliently connected with one member of the coupling members (i. e. the driving and driven members) and a shoe preferably resiliently connected with the free end of the arm and arranged to make contact with the other coupling member, and wherein the tangent of the angle which is included between a line joining the centre of the resilient connection (in the normal condition thereof) of each arm with the driving member to the point of contact of its shoe with the driven member (or if contact is made over a large area then with the centre of pressure) and a line normal to the surface of the driven member at the point of contact (or centre of pressure) is greater than the maximum kinetic co-efficient of friction.

By keeping the said angle greater than the kinetic co-efficient of friction it is possible to avoid shock in taking up the drive and yet retain the valuable feature that the pressure of the driving element on the shoes tends to assist the centrifugal or engaging force in taking up the drive. Moreover, by this means, on "overrunning" a free-wheel action is facilitated,

2

The present invention does not extend to cases where the operative direction of rotation is such that the driving member tends to pull the shoe behind it, as in such cases no wedging action takes place.

By the expression "kinetic co-efficient of friction" is meant that co-efficient of friction of the materials used when there is relative movement between the two surfaces which are in frictional engagement.

According to one construction in accordance with the invention a plurality of clutch elements are resiliently connected with one member at points offset from its centre for movement relative to that member in a plane at right angles to its axis, and springs extend between adjacent elements each from a point at or near the resilient pivot of one element to a point on the adjacent element at a greater distance from the resilient pivot of that element. This construction ensures that the clutch elements when they are not thrown outwards by the centrifugal or engaging force are all folded down around the clutch member to which they are resiliently pivoted out of contact with the other member. If desired each spring may extend from a point on the arm of one element adjacent to its resilient pivot (or from the resilient pivot itself) to a point on the shoe of the adjacent element.

If desired auxiliary friction surfaces may be provided on the two members and these members may be movable axially in relation to one another to engage said surfaces.

The resilient pivots are conveniently constituted by sleeves, strips or blocks of rubber or rubber composition or like resilient material secured in position by compression or by bonding so that in operation the resilient pivots are in shear.

Figure 1:
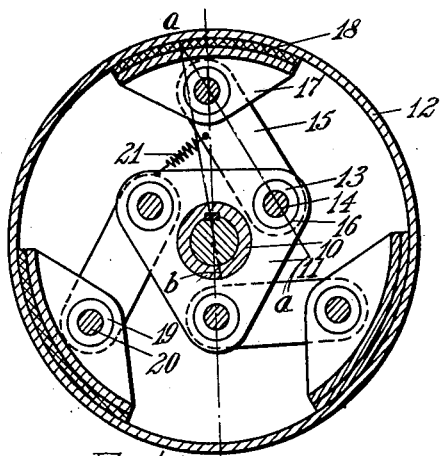
Figure 3:
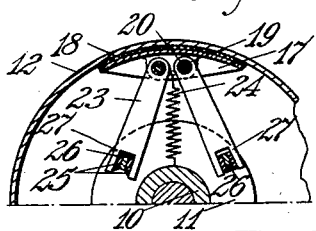
Figure 4:
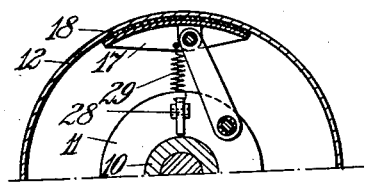
Figure 5:
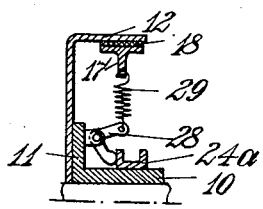
Figure 6:
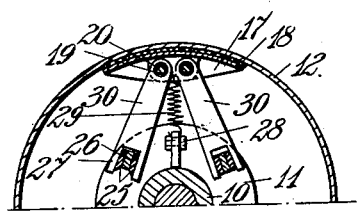

In the accompanying drawings:

Figure 1 shows one construction of friction coupling in accordance with the invention, Figure 2 is a vertical section of Figure 1, Figure 3 shows a modified construction, Figures 4 and 5 show in elevation and in section respectively a further modification, Figure 6 shows a modification of the construction shown in Figures 4 and 5, Figure 7 shows in detail a friction coupling in accordance with the invention, the section being on the line 7—7 in Figure 8, Figure 8 is a section on the line 8—8 in Figure 7, Figure 9 is a fragmentary view showing a further modification, Figure 10 is a fragmentary view showing the form of the resilient pivots employed in the construction according to Figure 9.

In one construction according to the invention as illustrated in Figures 1 and 2 a friction coupling is provided consisting of a driving member 10 provided with a boss or spider 11 and a drum (or driven member) 12 the driving member being arranged for rotation in a counter clockwise direction. Pivoted on resilient sleeves 13 on pins 14 on the boss 11 are a number of arms 15, which extend forwardly and outwardly in the direction of rotation of the driving member. The said sleeves 13 of rubber or like resilient material may be bonded on their inner peripheries to their respective pins 14 on the boss (or spider) and on their outer peripheries to boss portions or openings 16 formed near the inner ends of the arms to receive the pivots thereby constituted. Alternatively, the resilient sleeves may be secured in position by compressing them into the respective positions. To the free end of each arm 15 a clutch-shoe 17, faced with friction material 18, is resiliently pivoted through the medium of a rubber or like sleeve 19 secured about a pivot pin 20 on the clutch shoe and conveniently bonded to the metal of the adjacent surfaces. A tension spring 21 extends between the resilient pivot of one said arm 15 and a point 22 on the adjacent arm which is substantially centrally disposed with respect to the ends thereof. These springs therefore tend to fold the arms 15 down about the centre of the driving member 10. Alternatively, the springs 21 can be dispensed with and the shoes 17 biassed inwardly towards the boss or spider 11 by the action of the resilient material in its free position.

The operation of the friction coupling is as follows: Assuming the driving member 11 to be rotated in a counter clockwise direction and the driven member 12 to be stationary, the driving member is speeded up until the centrifugal force acting on the clutch elements (each constituted by a pivoted arm 15 and shoe 17) is sufficient to overcome the force exerted by the tension springs 21 above mentioned. These clutch elements will then be thrown outwards into engagement with the interior of the drum, the relative movement being taken up by distortion of the resilient material. The drum is therefore caused to tend to rotate (in the case of a clutch or coupling) and due to the resisting torque and to the difference in speeds between the driving and driven member, the clutch elements will tend to wedge into firm engagement with the drum; the greater the resisting torque the tighter will they be wedged into engagement. If at any period the driven member overruns the driving member then the frictional drag will decrease this wedging action, and if the speed of the driving member drops below a certain predetermined value at which the centrifugal force on the clutch elements equals the force exerted by the above mentioned tension springs, then the clutch elements will be moved completely out of engagement with the drum, and the clutch will act as a free-wheel. There is a very definitely defined angle between the line of thrust which is the line passing through the pivots of the link 15 and a line normal to the surface of the drum where the line of thrust intersects the drum surface. This angle, which is hereinafter referred to as $\theta$, and may be regarded as being the wedging or servo angle, is critical, as the smaller the angle the greater will be the wedging action.

Thus, the apparent co-efficient of friction between the surfaces of the shoe and drum is $$\frac{\mu}{1-\mu \cot \theta}$$

where $\mu$ is the actual co-efficient of friction and $\theta$ the wedging angle. For any given value of $\mu$ there is a limiting value, then the apparent co-efficient of friction is infinite and jamming takes place. On the other hand if the angle $\theta$ be increased beyond the critical value the apparent co-efficient of friction falls away rapidly.

Accordingly in order to obtain the greatest power from the clutch it is desirable to make the wedging angle slightly greater than but as close to the critical value as possible, and preferably the angle is made such that the apparent co-efficient of friction when the kinetic value of $\mu$ is operating is definite, but becomes indefinite when the static value of $\mu$ comes into operation as soon as the slip during engagement ceases. Thus the wedging angle must be very closely defined, and with a construction such as shown in Figure 1 and with very little or no friction at the link pivots between the link and boss and between the link and shoe this angle can be defined within very close limits.

It is known from elementary mechanics that if there be friction at the pivots then the line of thrust is not through the centres of the pivots but is tangent to the friction circles of the pivots. Thus if there is appreciable or varying friction at the pivots then the line of thrust may vary. By the use of distorting rubber bushes as shown in Figure 1, however, friction at the pivots is reduced to a minimum, thus permitting a definite control of the angle $\theta$ and enabling the line of thrust to be accurately defined. It can be shown that if the tangent of the angle $a$, $a$, $b$ included between the centre lines $a—a$ of the thrust in the arms (which are almost coincident with the lines joining the centres of the resilient connections with the centres of pressure) and the radius $a—b$ of the drum at the point of contact of this thrust line and the drum is greater than the maximum kinetic co-efficient of friction, then the frictional force set up is a function of speed of the driving member so that the torque transmitted increases with engine speed and the drive is taken up gradually and without shock.

If the tangent of the angle above-mentioned is between the static and kinetic co-efficients of friction of the materials used, then the drive will be taken up gradually and without shock, but the drive will not slip when once it is engaged.

If the tangent of the angle is greater than both the kinetic and static co-efficients of friction, not only will the drive be taken up gradually and without shock but overload will cause the clutch to slip, which is an advantage in certain cases.

In the modification shown in Figure 3 the device is arranged to take up the drive in the case of a clutch, or to exert a braking effort in the case of a brake, in either clockwise or counterclockwise directions of rotation. To this end each shoe 17 is pivoted, by resilient connections 19 and 20 as aforesaid, to two arms 23 also resiliently connected as aforesaid with the central boss or spider. The clutch-shoe may be drawn down out of contact with the drum 12 by means of a radial tension spring 24. The arrangement is such that in one direction of rotation one of the arms 23 will take the thrusts and the other arm will, by distortion of the resilient material, move relatively to the central fixed pivot pin on the boss or spider with which this resilient material is connected to provide the desired resilient connection at this point. In the reverse direction of rotation these conditions will be reversed. On the initial reverse movement the spring 24 tends to free the clutch or brake, but in either direction it is that arm 23 which pushes on the shoe in such a direction as to tend to wedge it which is effective. In this construction each arm 23 is shown resiliently connected at its inner end to the boss or spider 11 by means of a pair of pads 25 of rubber or like resilient material which are either bonded to the opposite surfaces presented by an inner abutment 26 and the inner surfaces of the two arms 27 of a fork formed at this end of each arm 23 or are secured in position between these opposite surfaces by compression.

In a further modification as illustrated in Figures 4 and 5 for each clutch shoe 17 a bell-crank lever 28 is pivoted on the boss of the driving member. One end of this bell-crank lever is joined by a radial tension spring 29 to its shoe, while the other is in contact with a collar 24 which is slidably mounted on the driving member 10. The arrangement is such that by moving the collar 24 along the driving member, the force exerted by the spring 29 tending to hold the shoe out of engagement (and acting in opposition to the centrifugal force of the shoe and its arm) may be varied and therefore a certain manual control of the operation of the clutch or brake may be exercised.

Figure 6 is a modification of the construction shown in Figures 4 and 5 in which two arms 30 are employed for each shoe so that the coupling can be employed to operate automatically in both directions of rotation. In this construction the inner ends of the arms 30 are forked and connected to abutments 26 on the central boss or spider 11 by resilient pads 25 as in Figure 3. The outer ends of the arms are also resiliently connected with the brake shoes through the medium of the pins 20 and rubber or like sleeves 19 as in the previous constructions.

A clutch suitable for use on an automobile and shown in Figures 7 and 8 comprises a driving shaft 10 bolted to a flywheel 33 and a driven member in the form of a drum 12 located concentrically within the flywheel. The drum 12 is mounted for sliding movement upon a shaft 34, the inner end of which is journalled in a ball-bearing 35 supported in a centre boss 11 of the driving member. This centre boss is bolted to the shaft 10 and to the flywheel 33 by pivot pins 36; the latter are equally spaced around the centre boss 11 and parallel to its axis, and upon each of them an arm 37 is pivotally and resiliently mounted through the medium of a sleeve 38 of rubber or like resilient material secured about the pin 36 so as to fill an annular space formed between the pin and a boss or hole in the arm, the resilient sleeve 38 being conveniently bonded to the adjacent metal surfaces or being held in position therebetween by compression. As viewed in Figure 8 the driving member is arranged for rotation in a counterclockwise direction and the arms 37 extend outwardly and forwardly having regard to the direction of rotation. On the inner end of each arm there is an extension 39 rearwardly inclined with regard to the direction of rotation which, when the arm is fully extended, contacts with the central boss 11 and connected between each extension 39 and the central boss there is a compression spring 40. The outer end of each arm 37 carries a pin 41 about which a link 42 is pivotally mounted through the medium of a rubber or resilient sleeve 43 to provide a resilient pivotal connection similar to that provided at the inner end of the arm. Each such link 42 consists of duplicate parts located one on each side of the arm 37 and terminating on the inner side of the pivot pin 41 in a balance-weight 44. Each pair of balance-weights is joined by a stop-pin 45 which passes through a hole 46 in the appropriate arm 37. Between the outer ends of the two parts of each link 42, a clutch-shoe 17 faced with friction material 18 is pivotally connected also by means of a sleeve 47 of rubber or like resilient material mounted about a fixed pin 48 on the clutch shoe and conveniently bonded to the adjacent metal surfaces or secured in position therebetween by compression. The balance-weights 44 counterbalance the weight of the clutch-shoe 17, the link 42 and the pin 48, and the centre of gravity of the shoe, link and balance-weights coincides approximately with the axis of the pin 41.

The action of the clutch is as follows: With the driving shaft 10 stationary or only revolving at low speeds, the arms 37 are folded round the boss 11 and the shoes 17 held clear of the drum 12. When the speed increases to a value at which centrifugal force overcomes the pressure of the springs 40, the arms fly outwards until the shoes make contact with the drum. At this period the inner extensions 39 of the arms do not touch the central boss 11 of the driving member. The frictional drag on the shoes 17 presses the stop-pins 45 against the inner edge of their appropriate holes 46 in the arms 37, and the links 42 and the arms 37 transmit the drive solidly. By making the balance-weights 44 not quite sufficiently heavy to counterbalance the links 42 and the shoes 17, centrifugal force will tend to hold the stop pins 45 in the position shown in Figure 8. Alternatively, or additionally, a light spring 49 (shown dotted in Figure 8) may be employed for this purpose. Or the resilient connections may be biassed to give this effect. When the speed of rotation is such that the centrifugal force acting on the balance-weights 44 tending to straighten the toggle comprised by a link 42 and its arm 37 is greater than the frictional driving thrust on the shoe tending to make the link pivot about the pin 41 through the medium of the rubber or resilient sleeve 43, then the arm and the link will tend to straighten out until the inner extension 39 of the arm makes contact with the boss 11, thus limiting the load upon the pivot pins 36 and also the bursting effect on the drum 12. For smooth engagement and take-up of the drive, the tangent of the angle between a line joining the centres of the pivot pins 36 and 48 and a radial line through the centre of the pivot pin 48 on the clutch shoe is greater than the maximum kinetic co-efficient of friction. In order to provide for a non-slipping or self-locking drive when the link 42 and the arm 37 are in the fully extended position, the wedging or servo angle between the centre line of the link and a radial line through the centre of the clutch shoe pivot pin 48 is in this case made less than the limiting angle of friction, that is, the critical angle at which the apparent co-efficient of friction between the surfaces of the clutch shoe and the drum is infinite.

The drum 12 is provided with a flange 50 faced with friction material which by means of the pedal 51, compression spring 52 and thrust bearing 53 may be pressed against the central flange 54 of the fly-wheel, in order that the engine may be used as a brake.

This device may be fitted as a clutch in a motor-car or other vehicle between the engine and gear box in place of one of the existing known types of clutches, and as explained above may be engaged and disengaged automatically as the engine is speeded up or slowed down beyond a predetermined speed. If the gear box is placed in neutral and the engine allowed to idle over so slowly that the centrifugal force on the clutch element is not sufficient to overcome the spring tension, then the clutch continues disengaged. If the vehicle is then placed in gear and the engine speeded up until the centrifugal force exceeds the spring tension, the arms will fly out about their resilient pivots and the shoes engage the inner surface of the drum, causing the latter to rotate. Thus the clutch may be so designed that in order to release it for gear changing it is only necessary to reduce the fuel supply to the engine, and in traffic it is only necessary to slow the engine and to apply the brake in order to slow down or stop the vehicle, the clutch automatically disengaging and re-engaging as the engine is speeded up again.

By making certain minor modifications (e. g. by holding the drum 12 stationary) to the design of the clutch illustrated in Figures 7 and 8, it may be used as a brake, in which case the drum may be water-cooled if desired.

It will be appreciated that all the constructions described above embody the feature of centrifugal application of the shoes to the drum assisted by "servo" action of the shoes, and they all embody that relationship between the kinetic co-efficient of friction and the tangent of the angle included between the thrust line (or the line joining the centre of pressure and the resilient pivot of the link) and the normal line, specified herein.

In a modification as shown in Figures 9 and 10, a clutch, brake or coupling is provided comprising a central spider having three legs 55, (only one of which is shown in Figure 9), at approximately 120° to each other. To each of the legs 55, the inner end of a rod or bar 56 is secured through the medium of a resilient connection which provides torsional flexibility and permits the rod to partake of restricted angular movement relatively to the spider (such angular movement being substantially tangential to the centre of the spider), the said rods or bars each carrying at their outer ends a shoe element 17 which is adapted to have driving engagement with the outer drum 12, which forms the driven member. The outer end of each leg of the spider is formed with a socket 57 in which the inner end of the corresponding rod or bar 56 is secured by means of strips or blocks 58 of rubber or like material preferably bonded to opposite surfaces of the rod or bar and to the adjacent surfaces of the socket. As shown in Figure 9 the pivotal connection of the shoe with its bar or rod 56, the outer end of which is formed with an opening or boss 59 in which a sleeve 60 of rubber or like resilient material may be secured to fill an annular space formed between the opening and a central pivot pin 61 on the inside of the shoe, whereby a resilient pivotal connection is afforded between the shoe and its rod or bar.

The various constructional arrangements provided in accordance with the invention possess the feature that the drive is cushioned by the resilient connections afforded, the small degree of relative movement between the working parts being allowed for by distortion of the resilient substance and the degree of flexibility both for torsion and alignment being predetermined.

Apart from the friction surfaces on the shoe members no mechanical sliding parts are required and hence the need for lubrication is obviated.

I claim:

1. A friction coupling, comprising a drum and a boss within it independently rotatable about the same axis, arms resiliently pivoted to said boss around its centre, each arm lying on a non-radial line, a link resiliently pivoted to the end of each arm, a shoe resiliently pivoted to the end of each link and a balance weight for the shoe on each link, whereof the centre of gravity of each shoe, link and weight coincides approximately with the centre of the resilient pivot of the link, the said resilient pivots being constituted by rubber, secured in position so that in operation the resilient pivots are in shear.

2. In a friction coupling the combination of a driving member and a driven member independently rotatable about the same axis, at least one link resiliently pivoted to one of said members, at least one shoe resiliently pivoted to the link for movement into frictional engagement with the other member by centrifugal action, said shoe wedging in one direction of relative rotation between the two members and tending to free in the other direction, auxiliary friction surfaces on the two members, and means for moving one of said members axially in relation to the other to engage said auxiliary surfaces, the said resilient pivot being constituted by rubber, secured in position so that in operation the resilient pivots are in shear.

3. In a friction coupling the combination of a drum and a boss concentric therewith and rotatable independently of it, a number of arms resiliently pivoted to the boss for movement about axes spaced around but parallel to the axis of rotation of the boss, said arms extending outwards in non-radial directions, a link resiliently pivoted to the free end of each arm, a shoe resiliently pivoted to the free end of each link and movable by centrifugal action into frictional engagement with the drum, and a balance weight on each link on the opposite side of the resilient pivot of the link from the shoe whereof the angle, included between a radial line from the axis of rotation through the pivot of the shoe and a line through the centre of the resilient pivot of the shoe and the centre of the resilient pivot of the arm, is greater than the limiting angle of friction, all the said resilient pivots being constituted by rubber, secured in position so that in operation the resilient pivots are in shear.

4. In a friction coupling the combination of a drum and a boss concentric therewith and rotatable independently of it, a number of arms resiliently pivoted to the boss for movement about axes, spaced around but parallel to the axis of wards in non-radial directions, a link resiliently pivoted to the free end of each arm, a shoe resiliently pivoted to the free end of each link and movable by centrifugal action into frictional engagement with the drum, and a balance weight on each link on the opposite side of the resilient pivot of the link from the shoe, whereof the angle, included between the centre line of one of said links and a radial line through the resilient pivot of the shoe, is less than the limiting angle of friction, all the said resilient pivots being constituted by rubber, secured in position so that in operation the resilient pivots are in shear.

5. A friction coupling as claimed in claim 3, wherein an abutment is provided upon each of the arms pivoted to the boss to contact with a portion of the boss and limit movement of the arm under the influence of centrifugal force exerted upon the link beyond a predetermined extent.

6. A friction coupling as claimed in claim 3, wherein an abutment is provided on each of the arms pivoted to the boss to contact with a portion of the boss and limit movement of the arm relatively to the boss beyond a predetermined extent and resilient means normally urging each abutment away from the boss.

7. In a friction coupling the combination of a drum, a boss concentric therewith and rotatable independently thereof, a plurality of arms resiliently pivoted to the boss to move about axes spaced around but extending along the axis of rotation of the boss, said arms extending outwards in non-radial directions, abutments upon said arms engageable with a portion of the boss to limit outward movement of the arms to a predetermined extent and shoes resiliently pivoted upon said arms to co-operate with the drum under the influence of centrifugal force, all the said resilient pivots being constituted by rubber, secured in position so that in operation the resilient pivots are in shear.

8. In a friction coupling the combination of a drum, a boss concentric therewith and rotatable independently thereof, a plurality of arms resiliently pivoted to the boss to move about axes spaced around but extending along the axis of rotation of the boss, said arms extending outwards in non-radial directions, abutments upon said arms engageable with a portion of the boss to limit outward movement of the arms to a predetermined extent, shoes resiliently pivoted upon said arms to co-operate with the drum under the influence of centrifugal force and spring means for opposing said outward movement of said arms, all the said resilient pivots being constituted by rubber, secured in position so that in operation the resilient pivots are in shear.

9. A frictional coupling engaging and disengaging automatically with increase and decrease in speed of rotation, comprising in combination with a drum and a rotatable spider concentric therewith, a socket in each arm of the spider, a plurality of arms provided one for each arm of the spider and extending at its inner end into one of the sockets, a strip of rubber connected in the socket between one surface of the arm and the adjacent surface of the socket so that the relative pivotal movement thereby permitted between each arm and its socket places the rubber strips in shear and a shoe resiliently pivoted at the outer end of each said arm, each said arm extending outwards from the spider in non-radial directions and each said shoe being movable by centrifugal action into frictional engagement with the drum.

10. A friction coupling engaging and disengaging automatically with increase and decrease in speed of rotation, comprising a driven drum, a rotatable driving boss concentric with said drum, a series of arms attached to said boss by resilient pivots and extending outwardly therefrom and forwardly in the direction of rotation, each arm having a shoe attached to the outer end thereof by a resilient pivot and movable by centrifugal action into frictional engagement with the drum, said resilient pivots comprising resilient deformable material.

11. A friction coupling comprising a drum and a driving member within and rotatable about the axis of the drum, a plurality of arms extending outwardly of the driving member toward the drum and extending in a non-radial direction, a plurality of friction shoes, one for each arm, between the outer ends of the arms and the inner periphery of the drum, resilient pivot means at the opposite ends of each arm respectively connecting the arms with the shoes and the arms with the driving member whereby the arms and the shoes are movable outwardly under the influence of centrifugal force to engage the shoes of the inner periphery of the drum.

12. A friction coupling as defined in and by claim 11 and spring means normally urging the arms and the shoes connected thereto away from said drum.

CHARLES WALLACE CHAPMAN.

REFERENCES CITED

The following references are of record in the file of this patent:

UNITED STATES PATENTS

| Number | Name | Date |
|---|---|---|
| 1,793,888 | Whitehouse | Feb. 24, 1931 |
| 1,972,643 | Chapman | Sept. 4, 1934 |
| 2,340,415 | Eason | Feb. 1, 1944 |
| 2,375,509 | Fawick | May 15, 1945 |
| 2,380,191 | Sanzedde | July 10, 1945 |
| 2,396,579 | Krotz | Mar. 12, 1946 |